United States Patent
Peng et al.

(10) Patent No.: US 12,127,326 B2
(45) Date of Patent: Oct. 22, 2024

(54) SOLID TARGET SYSTEM FOR RADIONUCLIDE PREPARATION

(71) Applicant: HEFEI INSTITUTES OF PHYSICAL SCIENCE, CHINESE ACADEMY OF SCIENCES, Hefei (CN)

(72) Inventors: Xuebing Peng, Hefei (CN); Xu Han, Hefei (CN); Yonghua Chen, Hefei (CN); Peng Liu, Hefei (CN); Xin Mao, Hefei (CN); Jianghua Wei, Hefei (CN); Kaizhong Ding, Hefei (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 0 days.

(21) Appl. No.: 18/642,358

(22) Filed: Apr. 22, 2024

(65) Prior Publication Data

US 2024/0276630 A1 Aug. 15, 2024

(51) Int. Cl.
*H05H 6/00* (2006.01)
*G21K 5/10* (2006.01)

(52) U.S. Cl.
CPC ............ *H05H 6/00* (2013.01); *G21K 5/10* (2013.01); *H05H 2006/007* (2013.01)

(58) Field of Classification Search
CPC .... H05H 6/00; H05H 2006/007; H05H 7/001; G21K 5/08; G21K 5/10
See application file for complete search history.

(56) References Cited

U.S. PATENT DOCUMENTS

| | | | |
|---|---|---|---|
| 2,562,637 A | * | 7/1951 | Park .......... H05H 6/00 313/62 |
| 5,608,224 A | * | 3/1997 | Alvord ............ G21K 5/08 250/442.11 |

(Continued)

FOREIGN PATENT DOCUMENTS

| | | |
|---|---|---|
| CN | 108811294 A | 11/2018 |
| CN | 109489718 A | 3/2019 |

(Continued)

OTHER PUBLICATIONS

Zelong CHEN et al., "Applied Research of Dual-beam Technology to Produce Radioactive Nuclide in Medical Cyclotron", Chinese Medical Equipment Journal, vol. 30, No. 3, Mar. 15, 2009, pp. 66-67, 70.

(Continued)

*Primary Examiner* — Sharon M Davis

(57) ABSTRACT

A solid target system for the radionuclide preparation, including a cassette, an ejection sub-system, a laser radar positioning sub-system, a cooling sub-system and a control cabinet. The cassette includes a solid target component for the nuclide preparation and a shielding box. The ejection sub-system is configured to eject the cassette to a recovery hole after the nuclide preparation is completed. The laser radar positioning sub-system is arranged above the ejection sub-system, and is electrically connected to the control cabinet. Both sides of the cassette are each provided with the cooling sub-system for cooling down the solid target component. The control cabinet is electrically connected to a direct-current servo motor for controlling an operating state thereof.

10 Claims, 8 Drawing Sheets

(56) References Cited

U.S. PATENT DOCUMENTS

| | | | |
|---|---|---|---|
| 2018/0322972 A1 | 11/2018 | Pärnaste et al. | |
| 2019/0124755 A1* | 4/2019 | Vlasak | B65G 51/04 |
| 2020/0077506 A1 | 3/2020 | Sheh et al. | |
| 2021/0329772 A1 | 10/2021 | Bars et al. | |

FOREIGN PATENT DOCUMENTS

| | | | |
|---|---|---|---|
| CN | 111485206 A | 8/2020 | |
| CN | 113450938 A | 9/2021 | |
| CN | 214851953 U | 11/2021 | |
| CN | 114531768 A | 5/2022 | |
| CN | 115134984 A | 9/2022 | |
| WO | WO-2022236423 A1 * | 11/2022 | G21G 1/04 |
| WO | WO-2023229924 A2 * | 11/2023 | |

OTHER PUBLICATIONS

Xilin SUN et al., "Medical Cyclotron Production of 64Cu", Progress in Modern Biomedicine, vol. 16, No. 19, Jul. 10, 2016, pp. 3783-3787,3800.

\* cited by examiner

SOLID TARGET SYSTEM FOR RADIONUCLIDE PREPARATION

CROSS-REFERENCE TO RELATED APPLICATIONS

This application claims the benefit of priority from Chinese Patent Application No. 202310437062.8, filed on Apr. 23, 2023. The content of the aforementioned application, including any intervening amendments made thereto, is incorporated herein by reference in its entirety.

TECHNICAL FIELD

This application relates to radionuclide preparation, and more particularly to a solid target system for the radionuclide preparation.

BACKGROUND

In the current preparation of radionuclides for the tumor treatment, an accelerator is employed to accelerate charged particles to bombard the target plate to trigger nuclear reactions on the target surface, so as to produce the radionuclides. The existing target systems are predominated by liquid target systems, but the liquid target system is only applicable to the preparation of a few types of nuclides, and fails to meet the current clinical demand for diversified nuclides. There are only fewer types of solid target systems available in the prior art, and the nuclide production efficiency is unsatisfactory. Therefore, it is urgently needed to develop a high-efficiency solid target system to prepare more types of medical radionuclides. For most of the existing solid target systems, the solid target component is placed inside the accelerator. After being bombarded by the particles, the solid target component is taken out of the accelerator through a mechanical device and placed in a shielding box, and then the shielding box is transferred to the next hot cell for separation and purification. However, the limited internal space of the accelerator greatly limits the size of the target component itself. In addition, there is no cooling device inside the accelerator to cool the target component, which limits the beam intensity that the target component can withstand, thereby limiting the yield. As for the solid target system whose target component is placed outside the accelerator, it has not been reported yet about the use of circulating cooling water to cool the solid target component using. Moreover, most of the existing solid target systems fail to realize automatic replacement of target components, resulting in low production efficiency.

In view of the above technical defects, it is necessary to develop a new high-efficiency solid target system to increase the yield and diversity of medical radionuclides.

SUMMARY

In view of the above deficiencies in the prior art, an object of the present disclosure is to provide a solid target system for the radionuclide preparation, which can improve the radionuclide preparation efficiency and meet the preparation of a variety of nuclides.

In order to achieve the above object, the following technical solutions are adopted.

This application provides a solid target system for radionuclide preparation, comprising:

a first cassette in which a solid target component is provided;

an ejection sub-system;
a laser radar positioning sub-system;
a control cabinet;
a cooling sub-system;
a fixing base;
a workbench; and
a flange;

wherein the first cassette is arranged at a center of the solid target system; a back of the first cassette is provided with an upper water supply pipe, a drainage pipe and a lower water supply pipe in sequence from top to bottom; the upper water supply pipe and the lower water supply pipe are connected to a water supply end of the cooling sub-system; and the drainage pipe is connected to a drainage end of the cooling sub-system;

the ejection sub-system is arranged directly behind the first cassette; and the ejection sub-system is configured to eject the first cassette to fall into a recovery hole after the solid target component is bombarded;

the laser radar positioning sub-system is configured to transmit position information of the ejection sub-system to the control cabinet in real time;

the control cabinet is electrically connected to the laser radar positioning sub-system, and is configured to control an operating state of the ejection sub-system, so as to eject the first cassette to the recovery hole after the solid target component is bombarded;

the cooling sub-system is configured to cool down the solid target component with a cooling water; and the cooling water is configured to flow from the water supply end of the cooling sub-system to the solid target component to cool the solid target component, and flow back to the cooling sub-system through the drainage end of the cooling sub-system;

the fixing base is connected to the workbench through a first guide rail, such that the workbench is slidable forward and backward on the fixing base; and the first cassette, the ejection sub-system, the laser radar positioning sub-system, the cooling sub-system and the control cabinet are mounted on the workbench; and the flange is fixed on an accelerator, and is configured to guide a beam of the accelerator to the first cassette.

In some embodiments, the first cassette comprises an internal structure and an external structure; the internal structure is the solid target component, and a center of the solid target component is a position participating in a reaction; the center of the solid target component is made of oxygen-free copper; a material of the center of the solid target component is configured to be replaced to prepare a required nuclide; a portion of the solid target component other than the center is made of platinum for resistance to corrosion and strong acid; the external structure is a shielding box, and is configured to provide a vacuum environment for the radionuclide preparation and reduce an interference of an external factor on the radionuclide preparation.

In some embodiments, the laser radar positioning sub-system is configured to enable an operating accuracy of the ejection sub-system to reach a millimeter level to ensure that an ejection operation is completed safely and accurately.

In some embodiments, the cooling sub-system comprises a thermometer and a flow meter for monitoring a state of the cooling water; the cooling sub-system is connected to the first cassette through an electromagnetic clutch to facilitate separation; and the cooling sub-system is configured to enable the solid target component to withstand a heat flux of 8 MW/m$^2$, thereby improving a nuclide production efficiency.

In some embodiments, the workbench is configured to be driven by a translation motor to move relative to the fixing base; and the fixing base is mechanically connected to ground.

In some embodiments, the flange is provided with a vacuum pump connection port to create a vacuum environment for the radionuclide preparation; and the flange is configured to be connected to or separated from the first cassette through an electromagnetic clutch.

In some embodiments, the solid target system further comprises a second cassette in which a standby solid target component is provided; wherein the second cassette is arranged on an isolation plate; and the isolation plate is arranged directly above the first cassette.

In some embodiments, the solid target system further comprises a servo motor; wherein the first cassette is structurally identical to the second cassette; two sides of the second cassette are each provided with a groove; and the servo motor is configured to withdraw the isolation plate to allow the second cassette to fall into a predetermined operating position through the groove after the first cassette falls into the recovery hole.

In some embodiments, an ejector pin is provided behind the cooling sub-system; a support frame is arranged behind the ejector pin; the ejector pin is mechanically connected to the support frame; and both sides of the support frame are each provided with a second guide rail to enable the support frame to slide forward and backward.

In some embodiments, the laser radar positioning sub-system is mounted on the support frame; the support frame is mechanically connected to the laser radar positioning sub-system; a lead screw is arranged below the support frame, and is configured to drive the support frame to move forward or backward through forward or reverse rotation; a rear of the lead screw is connected to a servo motor; and the servo motor is configured to drive the lead screw to rotate forward or reversely.

In some embodiments, the control cabinet comprises a controller, a wireless fidelity (Wi-Fi) module, a human-computer interaction interface, a signal control station and a related control button.

In some embodiments, the laser radar positioning sub-system is fixedly mounted on the support frame, and is configured to transmit real-time position of the ejector pin to the control cabinet, thereby accurately ejecting a solid target component box to the recovery hole; the controller is connected to the servo motor through a relay, and is configured to control an operating state of the servo motor; the Wi-Fi module is mounted in the control cabinet, and is electrically connected to the controller; and the signal control station is wirelessly connected to the Wi-Fi module through a wireless network.

In some embodiments, the cooling sub-system comprises a water tank, a drainage pipe, two water supply pipes, a flow meter, a gear pump and a motor; the two water supply pipes are respectively connected to an upper connection port and a lower connection port of the first cassette; the drainage pipe of the cooling sub-system is connected to a middle connection port of the first cassette; and the gear pump and flow meter are arranged inside the cooling sub-system.

It can be seen from the foregoing that this application provides the ejection sub-system. The control cabinet is configured to control forward and reverse rotation and speed of the servo motor at an end of the solid target system, such that the ejection sub-system is driven by a transmission of the lead screw to perform a target ejection operation. An operation process is that the first cassette is ejected to the recovery hole using the ejector pin, and then sent to a hot chamber by the conveyor belt. Specifically, a pulse-width modulation (PWM) module can be provided on a control panel to control an output voltage and a current using a pulse width of a PWM signal, and further control a rotation speed of the servo motor to allow the ejection sub-system to complete a corresponding action. For example, when performing target ejection, a duty cycle is controlled by the control cabinet to allow the lead screw to rotate, thereby pushing the ejector pin to continuously approach a target element. When the ejector pin approaches the target element, the first electromagnetic clutch inside the cooling system can be disconnected first, such that a cooling pipe of the first cassette is disconnected from the water supply pipe and drainage pipe of the cooling sub-system. The duty cycle is automatically adjusted by the control cabinet to reduce the speed of the servo motor, thereby controlling a landing point of the target element when falling to be within the recovery hole. When the target element is ejected, a direction of the current is adjusted through the control cabinet, causing the servo motor to reverse to drive the lead screw to reverse to allow the ejection sub-system to be withdrawn. When the ejection sub-system is about to touch the end, the duty cycle is controlled to reduce the speed of the servo motor. The present disclosure provides the laser radar positioning sub-system, which can transmit the real-time position of the ejector pin back to the control cabinet to enable the target ejection system to accurately return to an initial position.

Therefore, the solid target system of the present disclosure has easy operation and high target component recovery accuracy. In the existing solid target component recovery devices, a multi-axis mechanical arm is commonly used to pick up the target from an outlet of the accelerator. However, errors may occur in the repeated positioning of individual axes of the multi-axis mechanical arm, and the target component itself has a small size, such that after multiple recovery operations, the recovery accuracy will be greatly reduced. Therefore, after a period of operation, the multi-axis robotic arm must be repositioned and calibrated. In view of this problem, the present disclosure proposes a new target component recycling method. Due to the integration of guide rail positioning and sensor positioning, the recovery accuracy of target components can be greatly improved, and errors caused by repeated positioning of the robotic arm in the traditional target component recovery methods can be avoided. Moreover, the rotation direction and speed of the servo motor are controlled through the control cabinet, such that the threat of radiation to an operator can be avoided, and the target system is enabled to complete the radionuclide preparation in a relatively complex environment. A solid reaction surface can greatly increase the variety of nuclides that can be prepared, promoting the cancer treatment. In addition, the cooling sub-system is also provided for the solid target component, such that the target element can withstand higher beam intensity, further improving the nuclide yield.

DETAILED DESCRIPTION OF EMBODIMENTS

Figure 1:
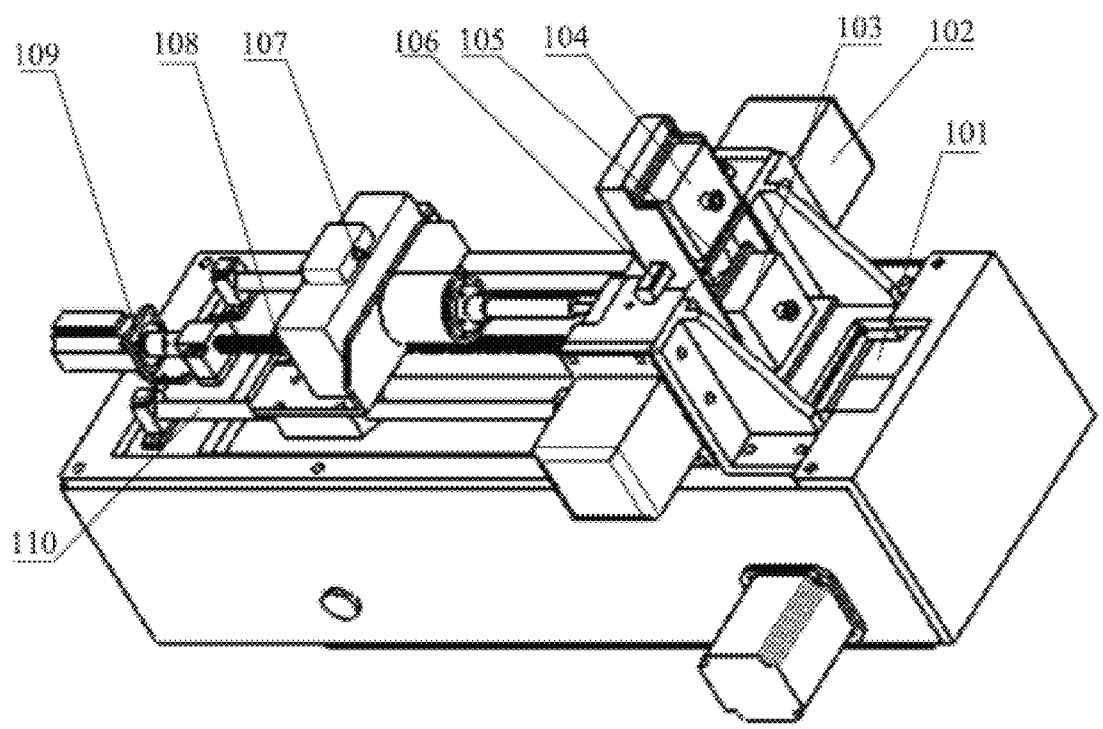
FIG. 1 is a structural diagram of a solid target system in accordance with an embodiment of the present disclosure.

In order to make the purpose, technical solutions and advantages of the present disclosure clearer, the present disclosure will be further described in detail below with reference to the embodiments and accompanying drawings.

The present disclosure provides a solid target system for the radionuclide preparation, as shown in FIGS. 1-7. The solid target system includes a cooling sub-system 102, an ejection sub-system and a control sub-system.

The cooling sub-system 102 includes a water tank 1, a motor 2, a gear pump 3, a first electromagnetic clutch 4, a thermometer 5 and a flow meter 6.

Figure 8:
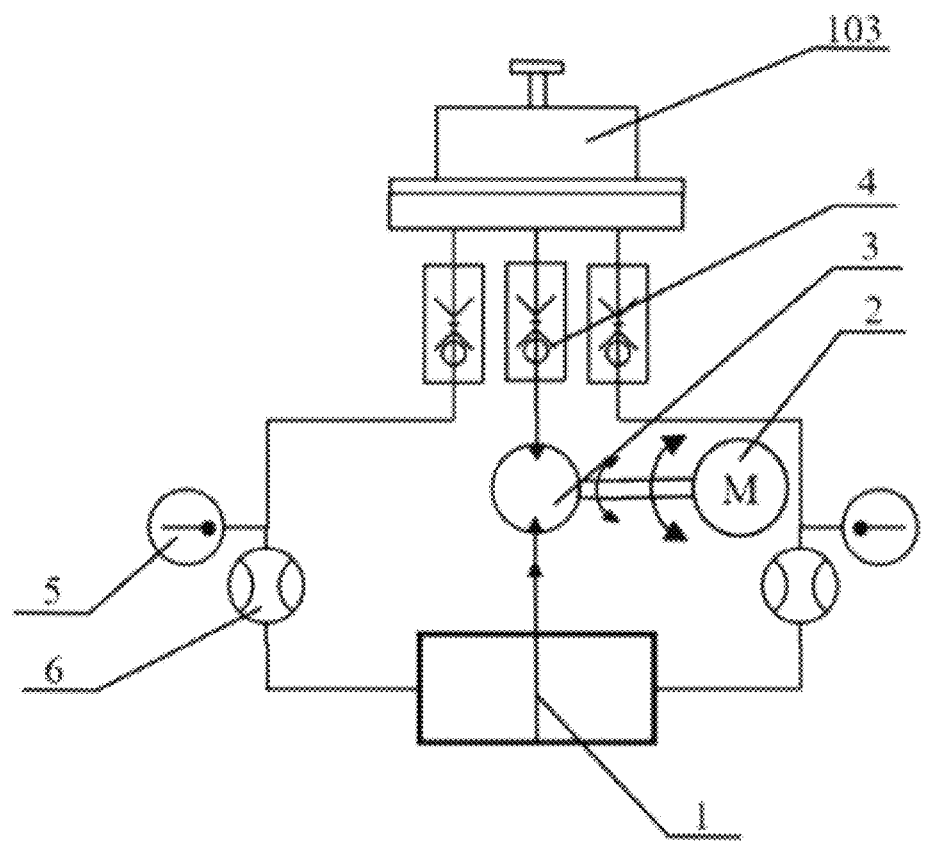
FIG. 8 is a schematic diagram of a connection between the solid target component-loaded cassette and a cooling sub-system in accordance with an embodiment of the present disclosure.

As shown in FIG. 8, the water tank 1 is arranged at a middle of the cooling sub-system 102. A middle pipe, a left pipe and a right pipe are provided on the water tank 1. The middle pipe is connected to a drainage pipe 203 provided on a first cassette 103, and a solid target component is provided in the first cassette 103. The left pipe is connected to an upper water supply pipe 202 of the first cassette 103. The right pipe is connected to a lower water supply pipe 204 of the first cassette 103. The left and right pipes are each provided with the thermometer 5 and the flow meter 6, which are electrically connected. The motor 2 and the gear pump 3 are mounted on the middle pipe. The motor 2 is mechanically connected to the gear pump 3. The gear pump 3 is mechanically connected to the middle pipe. The middle, left and right pipes provided on the water tank 1 are respectively connected to the drainage pipe 203, upper water supply pipe 202, and lower water supply pipe 204 on the first cassette 103 through the first electromagnetic clutch 4.

The ejection sub-system includes a first servo motor 106, a lead screw 108, a second servo motor 109, a guide rail 110, an ejector pin 112, a support frame 113, the first cassette 103, a second cassette 104 with a standby solid target component, and an isolation plate 105.

The control sub-system includes a control cabinet 111 and a laser radar positioning sub-system 107.

The solid target system further includes a recovery hole 101, a workbench 114, a fixing base 115, a translation motor 116, a vacuum pump connection port 117, a beam inlet 118, a flange 119, a second electromagnetic clutch 120, a conveyor belt 121, a beam interface 201, the upper water supply pipe 202, the drainage pipe 203, the lower water supply pipe 204, a target holder 205 and a beam bombardment surface 206.

As shown in FIG. 1, the recovery hole 101 is arranged at a front end of the solid target system. The first cassette 103 is arranged behind the recovery hole 101. The second cassette 104 is arranged on the isolation plate 105. The isolation plate 105 is arranged directly above the first cassette 103. Both sides of the isolation plate 105 are each provided with the first servo motor 106 mechanically connected to the isolation plate 105. The cooling sub-system 102 is provided behind the first cassette 103. The pipes of the cooling sub-system 102 are respectively connected to the pipes of the first cassette 103 through the first electromagnetic clutch 4 shown in FIG. 8.

Figure 2:
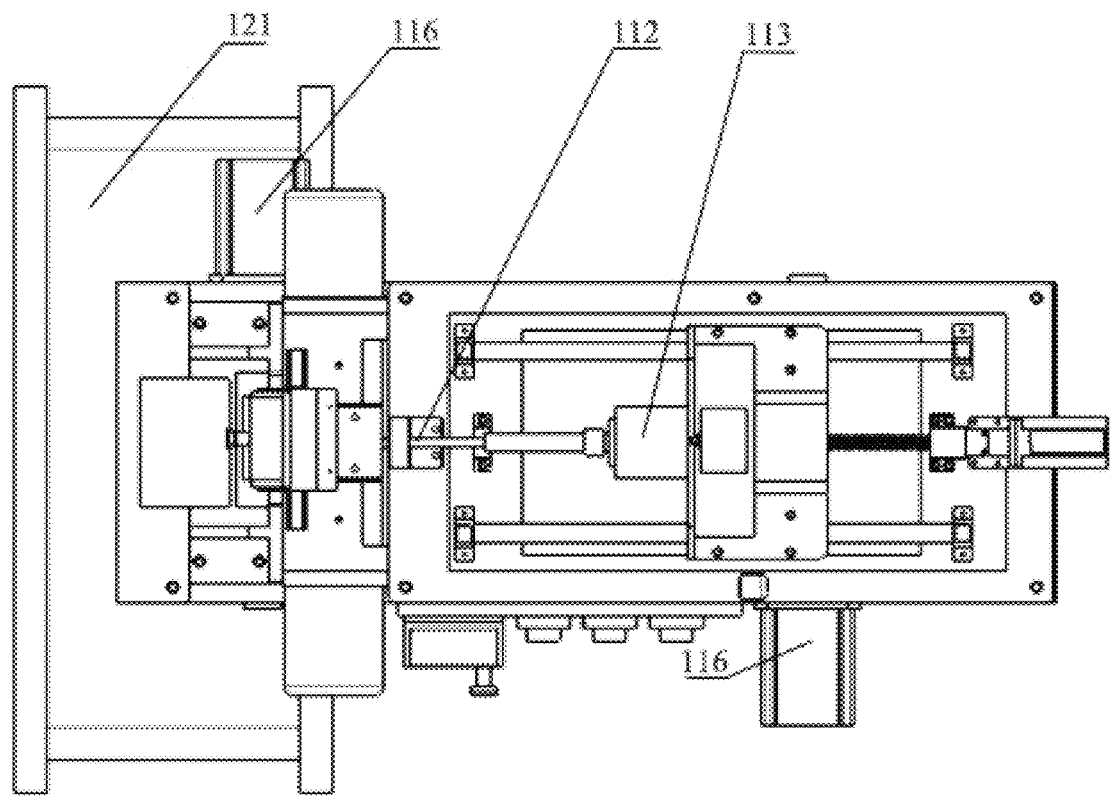
FIG. 2 is a top view of the solid target system in accordance with an embodiment of the present disclosure.

As shown in FIG. 2, an ejector pin 112 is provided behind the cooling sub-system 102. The ejector pin 112 is mechanically connected to the support frame 113 behind it. Both sides of the support frame 113 are each provided with the guide rail 110 to enable the support frame 113 to slidable forward and backward.

As shown in FIGS. 1-2, the laser radar positioning sub-system 107 is mounted on the support frame 113. The support frame 113 is mechanically connected to the laser radar positioning sub-system 107. The lead screw 108 is arranged below the support frame 113, and is configured to drive the support frame 113 to move forward and backward through forward and reverse rotation. A rear of the lead screw 108 is connected to the second servo motor 109 configured to drive the lead screw 108 to rotate forward or reversely.

Figure 3:
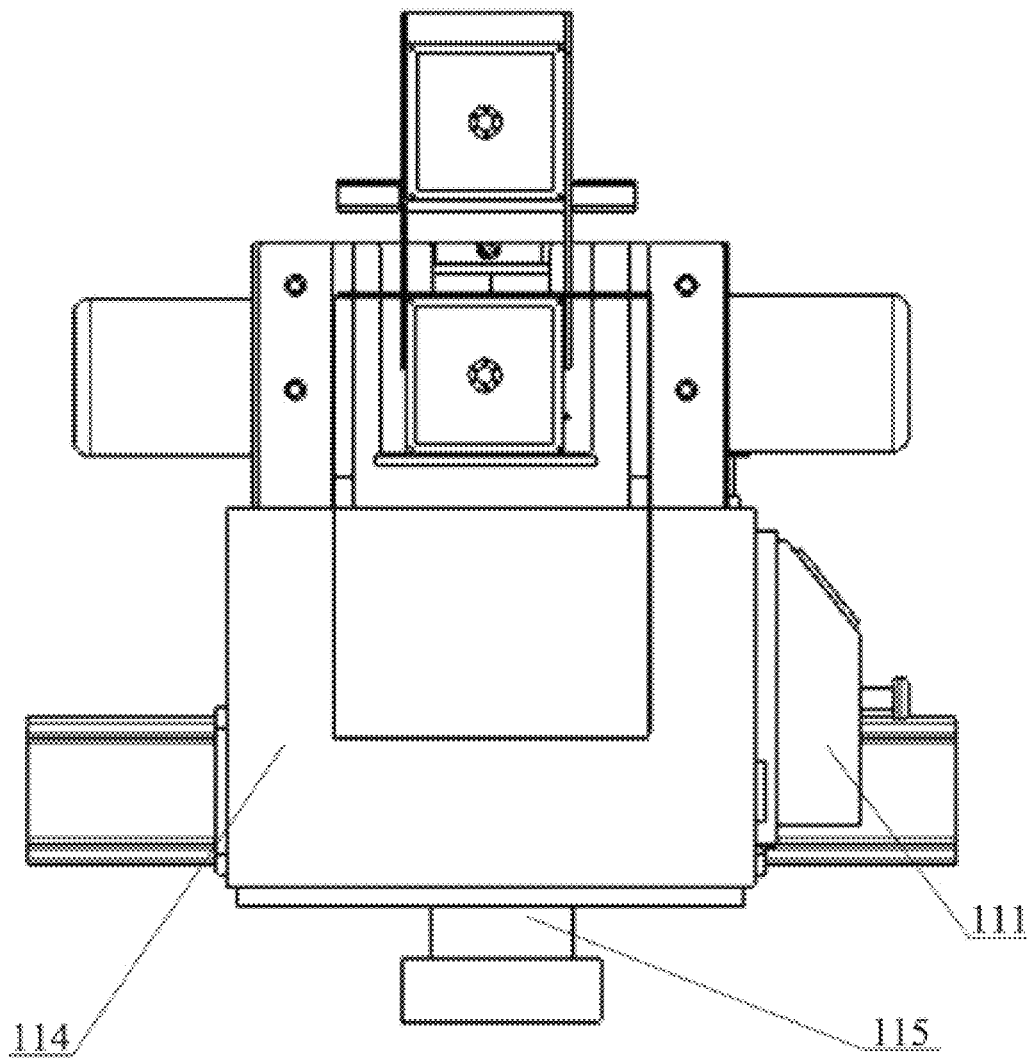
FIG. 3 is a side view of the solid target system in accordance with an embodiment of the present disclosure.

As shown in FIGS. 2-3, both sides of the workbench 114 are each provided with the translation motor 116. The translation motor 116 is configured to drive the workbench 114 to move relative to the fixing base 115. The fixing base 115 is mechanically connected to ground. The conveyor belt 121 is arranged directly below the recovery hole 101. The control cabinet 111 is fixed on a side of the workbench 114.

Figure 4:
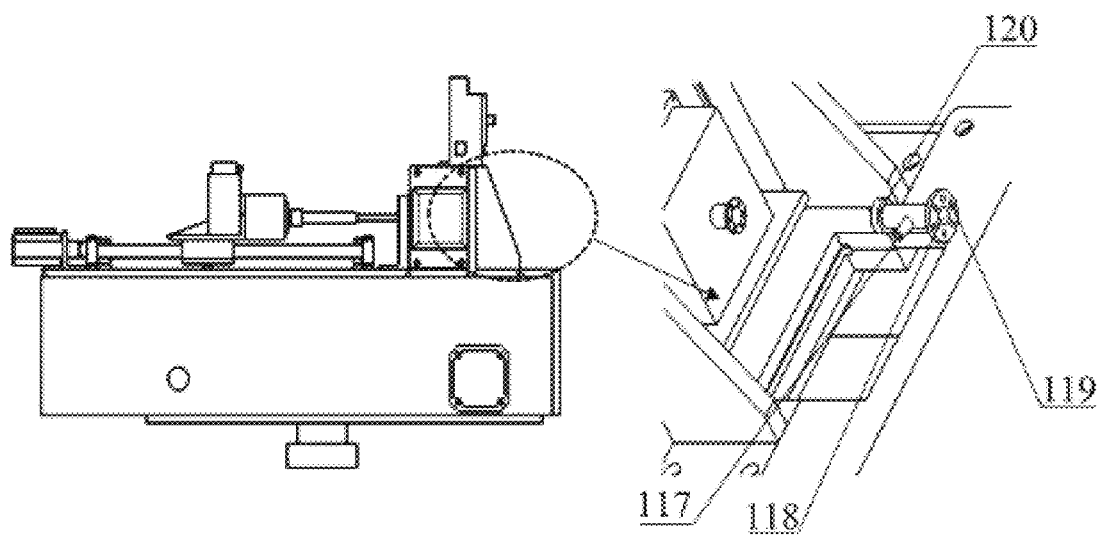
FIG. 4 is a front view of the solid target system in accordance with an embodiment of the present disclosure.
Figure 5:
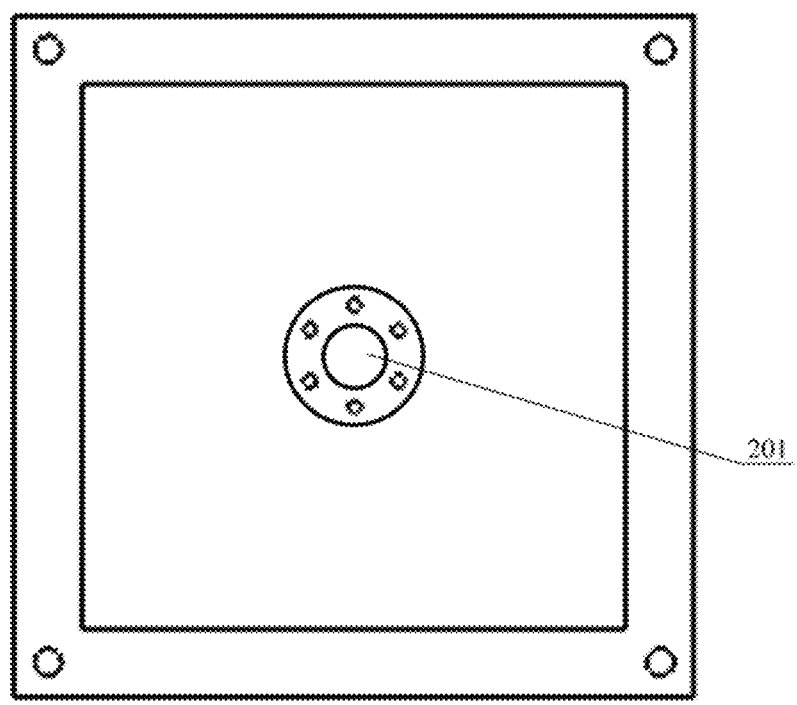
FIG. 5 is a front view of a solid target component-loaded cassette in accordance with an embodiment of the present disclosure.

As shown in FIGS. 4-5, the beam interface 201 is arranged in front of the first cassette 103, and is connected to the second electromagnetic clutch 120. The flange 119 is arranged in front of the second electromagnetic clutch 120, and is mechanically connected to an accelerator outlet. A center of the flange 119 is configured as the beam inlet 118. A side of the beam inlet 118 is provided with the vacuum pump connection port 117 mechanically connected to a vacuum pump (not shown in the figures).

Figure 6:
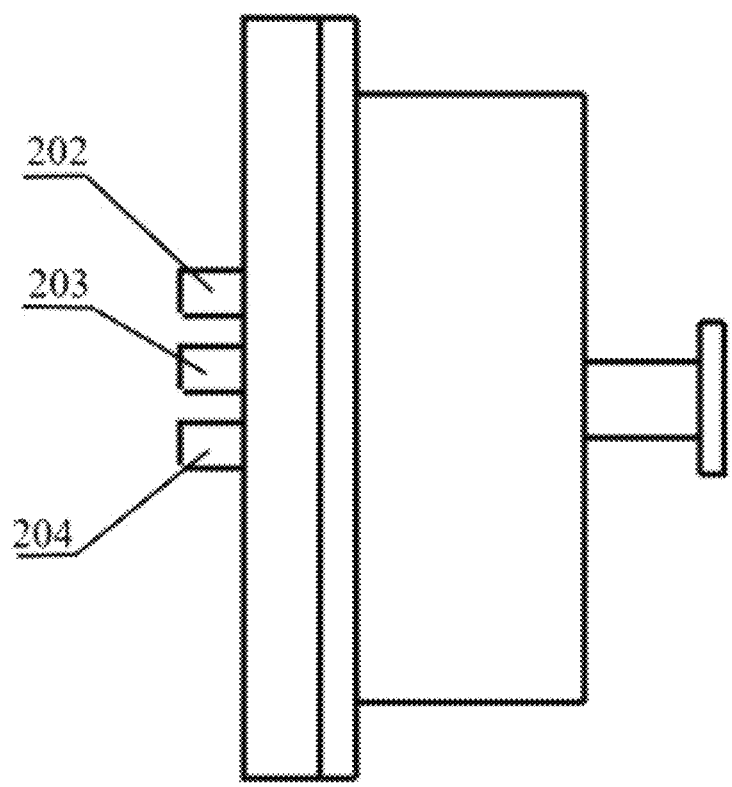
FIG. 6 is a side view of the solid target component-loaded cassette in accordance with an embodiment of the present disclosure.

As shown in FIG. 6, the upper water supply pipe 202, the drainage pipe 203 and the lower water supply pipe 204 are provided at a back of the first cassette 103 in sequence from top to bottom.

Figure 7:
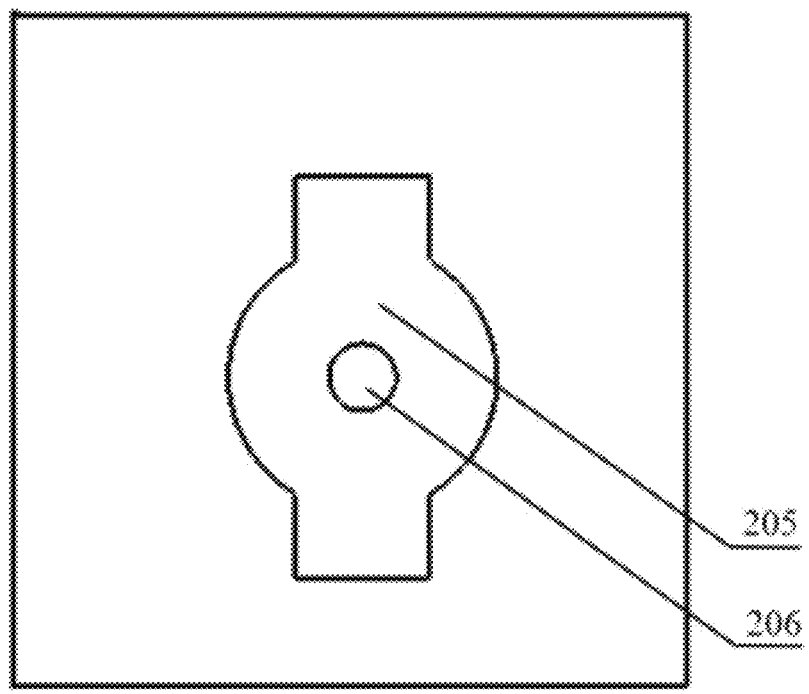
FIG. 7 is a structural diagram of an internal target component of the cassette in accordance with an embodiment of the present disclosure.

FIG. 7 is a schematic diagram of an internal target component of the first cassette 103. A center of the internal target component is the beam bombardment surface 206. The target holder 205 is arranged outside the beam bombardment surface 206. The beam bombardment surface 206 is embedded in a groove of the target holder 205.

The first cassette 103 is structurally identical to the second cassette 104. Two sides of the second cassette are each provided with a groove. After the first cassette 103 completes the nuclide preparation task and is ejected to the recovery hole 101, the first servo motor 106 is configured to withdraw the isolation plate 105 to allow the second cassette 104 to fall into a predetermined operating position through the groove, thereby improving the nuclide production efficiency. The number of the second cassettes 104 can also be set according to one operating cycle of the accelerator (which can be ≥1), thereby maximizing the nuclide production efficiency. Since the first cassette 103 is structurally identical to the second cassette 104, only the first cassette 103 will be described below.

A detailed structure of the first cassette 103 is shown in FIGS. 5-7. The workbench 114 is slidable on the fixing base 115 through the guide rail, such that the second electromagnetic clutch 120 can be coupled or disconnected from the beam interface 201 driven by the translation motor 116. The flange 119 is connected to the accelerator outlet. A vacuum membrane is arranged at the beam inlet 118. The vacuum pump connection port 117 is connected to the vacuum pump (not shown). The vacuum pump is configured to evacuate a left end of the beam inlet 118 into a vacuum state before nuclide preparation. When a bombardment starts, the beam bombardment surface 206 can withstand the beam bombardment. In order to prevent the target holder 205 and the beam bombardment surface 206 from being damaged by a high temperature, the cooling sub-system 102 is configured to water-cool the target holder 205 and the beam bombardment surface 206 through the upper water supply pipe 202 and the lower water supply pipe 204. A water flow that completes a cooling task is configured to be discharged through the drainage pipe 203.

When the beam bombardment is completed, the second electromagnetic clutch 120 is disconnected, and the first cassette 103 is separated from an accelerator. An upper portion of the solid target system is configured to be driven by the translation motor 116 to return to an initial position. At this time, the recovery hole 101 in the upper portion of the solid target system is opposite to the conveyor belt 121, and then the ejector pin 112 starts the target ejection. The ejector pin 112 is mechanically connected to the support frame 113. The control cabinet 111 is configured to control the forward and reverse rotation of the second servo motor 109, such that the ejector pin 112 is driven to expand and contract through the transmission of the lead screw. Specifically, a circuit can be generated through a pulse-width modulation (PWM) module in a STMicroelectronics 32-bit (STM32) microcontroller or by building a peripheral PWM. A pulse width of a PWM signal is configured to control an output voltage and current, and further control a rotation speed and forward and reverse rotation of the second servo motor 109, thereby allowing the ejection pin 112 to complete various actions. When performing target ejection, the second servo motor 109 is driven by the control cabinet 111 to rotate forward, and then the ejector pin 112 can continuously approach the first cassette 103. At the same time, the pipes on the first cassette 103 can be disconnected from the cooling sub-system 102. The first cassette 103 is connected to or disconnected from the cooling sub-system 102 through the first electromagnetic clutch 4, with a specific principle shown in FIG. 8. The ejector pin 112 is configured to eject the first cassette 103 to the recovery hole 101. The conveyor belt 121 is provided below the recovery hole 101, which is configured to send the first cassette 103 to a nuclide separation chamber, facilitating subsequent nuclide extraction and the next nuclide preparation task for the solid target system.

A buffer pad can be provided on a head portion of the ejector pin 112 configured to protect the ejector pin 112 and a target element.

A power module is provided in the control cabinet 111, and is configured to power servo motors and microcontrollers in the solid target system.

The control cabinet 111 is electrically connected to the first servo motor 106 and the second servo motor 109, and is configured to control operating states of the first servo motor 106 and the second servo motor 109.

Therefore, the present disclosure provides the ejection sub-system which facilitates recycling of the target element box. Compared with the lifting and lowering target pickup and target transporting device in the prior art, the manufacturing consumption of the entire solid target system can be reduced. In addition, the forward and reverse rotation and rotation speed of the second servo motor 109 can be controlled by the control cabinet 111, such that the solid target system can safely and automatically recycle the cassette, and can complete the nuclide preparation task excellently in a narrow environment. Due to the use of the PWM module and the laser radar positioning sub-system, the accuracy of the target ejection process is greatly improved.

The control cabinet 111 includes a controller, a wireless fidelity (Wi-Fi) module, a human-computer interaction interface, a signal control station and a related control button. The signal control station is wirelessly connected to the Wi-Fi module through a wireless network. The Wi-Fi module is electrically connected to the controller.

When the control cabinet 111 is operating, an external terminal can be artificially used to send a remote-control command to the control cabinet 111 through the signal control station, such that the operating states of the first servo motor 106 and the second servo motor 109 are controlled by the control cabinet 111, thereby ensuring a safe and stable operating state of the solid target system.

In some cases, there are some shortcomings in nuclide preparation through manual operation of the solid target system. For example, when the second servo motor 109 rotates too fast, a large error will occur if it is controlled through human observation. In order to solve this problem, the solid target system is provided with the laser radar positioning sub-system 107. The laser radar positioning sub-system 107 is configured to detect a real-time position of the first cassette 103 in real time and feed it back to the human-computer interaction interface to help personnel better understand an operating state of the ejection sub-system. The laser radar positioning sub-system 107 is electrically connected to the controller. Therefore, during operation, the ejection sub-system can be controlled in real time by the control cabinet 111 based on position information of the ejection sub-system sent back by the laser radar positioning sub-system 107 in real time, thereby safely and stably achieving tasks such as autonomous target ejection and autonomous recovery.

Those of ordinary skill in the art should understand that the embodiments described above are merely illustrative of the present application, and are not intended to imply that the scope of the present disclosure (including the claims) is limited to these embodiments. Within the idea of the present disclosure, the above embodiments or technical features therein can also be combined, and there are many other variations of the disclosure as described above in different aspects, which are not provided in detail for the sake of simplicity. Therefore, any omissions, modifications, equivalent substitutions and improvements made without departing from the spirit of the disclosure shall fall within the scope of the disclosure defined by the appended claims.

What is claimed is:

1. A solid target system for radionuclide preparation, comprising:
    a first cassette in which a solid target component is provided;
    an ejection sub-system;
    a laser radar positioning sub-system;
    a control cabinet;
    a cooling sub-system;
    a fixing base;
    a workbench; and
    a flange;

wherein the first cassette is arranged at a center of the solid target system; a back of the first cassette is provided with an upper water supply pipe, a drainage pipe and a lower water supply pipe in sequence from top to bottom; the upper water supply pipe and the lower water supply pipe are connected to a water supply end of the cooling sub-system; and the drainage pipe is connected to a drainage end of the cooling sub-system;

the ejection sub-system is arranged directly behind the first cassette; and the ejection sub-system is configured to eject the first cassette to fall into a recovery hole after the solid target component is bombarded;

the laser radar positioning sub-system is configured to transmit position information of the ejection sub-system to the control cabinet in real time;

the control cabinet is electrically connected to the laser radar positioning sub-system, and is configured to control an operating state of the ejection sub-system, so as to eject the first cassette to the recovery hole after the solid target component is bombarded;

the cooling sub-system is configured to cool down the solid target component with a cooling water; and the cooling water is configured to flow from the water supply end of the cooling sub-system to the solid target component to cool the solid target component, and flow back to the cooling sub-system through the drainage end of the cooling sub-system;

the fixing base is connected to the workbench through a first guide rail, such that the workbench is slidable forward and backward on the fixing base; and the first cassette, the ejection sub-system, the laser radar positioning sub-system, the cooling sub-system and the control cabinet are mounted on the workbench; and the flange is fixed on an accelerator, and is configured to guide a beam of the accelerator to the first cassette.

2. The solid target system of claim 1, wherein the first cassette comprises an internal structure and an external structure; the internal structure is the solid target component, and a center of the solid target component is a position participating in a reaction; the center of the solid target component is made of oxygen-free copper; a material of the center of the solid target component is configured to be replaced to prepare a required nuclide; a portion of the solid target component other than the center is made of platinum for resistance to corrosion and strong acid; the external structure is a shielding box, and is configured to provide a vacuum environment for the radionuclide preparation and reduce an interference of an external factor on the radionuclide preparation.

3. The solid target system of claim 1, wherein the laser radar positioning sub-system is configured to enable an operating accuracy of the ejection sub-system to reach a millimeter level.

4. The solid target system of claim 1, wherein the cooling sub-system comprises a thermometer and a flow meter for monitoring a state of the cooling water; the cooling sub-system is connected to the first cassette through an electromagnetic clutch to facilitate separation; and the cooling sub-system is configured to enable the solid target component to withstand a heat flux of 8 $MW/m^2$.

5. The solid target system of claim 1, wherein the workbench is configured to be driven by a translation motor to move relative to the fixing base; and the fixing base is mechanically connected to ground.

6. The solid target system of claim 1, wherein the flange is provided with a vacuum pump connection port to create a vacuum environment for the radionuclide preparation; and the flange is configured to be connected to or separated from the first cassette through an electromagnetic clutch.

7. The solid target system of claim 1, further comprising:
a second cassette in which a standby solid target component is provided;
wherein the second cassette is arranged on an isolation plate; and the isolation plate is arranged directly above the first cassette.

8. The solid target system of claim 7, further comprising:
a servo motor;
wherein the first cassette is structurally identical to the second cassette; two sides of the second cassette are each provided with a groove; and the servo motor is configured to withdraw the isolation plate to allow the second cassette to fall into a predetermined operating position through the groove after the first cassette falls into the recovery hole.

9. The solid target system of claim 1, wherein an ejector pin is provided behind the cooling sub-system; a support frame is arranged behind the ejector pin; the ejector pin is mechanically connected to the support frame; and both sides of the support frame are each provided with a second guide rail to enable the support frame to slide forward and backward.

10. The solid target system of claim 9, wherein the laser radar positioning sub-system is mounted on the support frame; the support frame is mechanically connected to the laser radar positioning sub-system; a lead screw is arranged below the support frame, and is configured to drive the support frame to move forward or backward through forward or reverse rotation; a rear of the lead screw is connected to a servo motor; and the servo motor is configured to drive the lead screw to rotate forward or reversely.

* * * * *